United States Patent
Tan et al.

(10) Patent No.: US 12,508,323 B2
(45) Date of Patent: Dec. 30, 2025

(54) METHOD OF TREATMENT OF COLORECTAL, BREAST AND LUNG CANCER WITH METAL CONTAINING IMMUNE AGONIST COMPLEXES

(71) Applicant: HANGZHOU XINGAO BIOTECHNOLOGY CO., LTD., Hangzhou (CN)

(72) Inventors: Xiangshi Tan, Hangzhou (CN); Daofeng Xiang, Hangzhou (CN); Jianwu Pei, Hangzhou (CN)

(73) Assignee: HANGZHOU XINGAO BIOTECHNOLOGY CO., LTD., Zhejiang (CN)

( * ) Notice: Subject to any disclaimer, the term of this patent is extended or adjusted under 35 U.S.C. 154(b) by 580 days.

(21) Appl. No.: 17/944,066

(22) Filed: Sep. 13, 2022

(65) Prior Publication Data

US 2023/0055473 A1   Feb. 23, 2023

Related U.S. Application Data

(63) Continuation of application No. PCT/CN2020/081044, filed on Mar. 25, 2020.

(30) Foreign Application Priority Data

Mar. 14, 2020 (CN) .......................... 202010178179.5

(51) Int. Cl.
| | | |
|---|---|---|
| *A61K 47/69* | (2017.01) | |
| *A61K 47/68* | (2017.01) | |
| *A61P 1/00* | (2006.01) | |
| *A61P 9/10* | (2006.01) | |
| *A61P 11/00* | (2006.01) | |
| *A61P 25/28* | (2006.01) | |
| *A61P 29/00* | (2006.01) | |
| *A61P 31/14* | (2006.01) | |
| *A61P 35/00* | (2006.01) | |
| *A61P 35/04* | (2006.01) | |

(52) U.S. Cl.
CPC ...... *A61K 47/6913* (2017.08); *A61K 47/6807* (2017.08); *A61K 47/6811* (2017.08); *A61K 47/6849* (2017.08); *A61K 47/6851* (2017.08); *A61P 1/00* (2018.01); *A61P 9/10* (2018.01); *A61P 11/00* (2018.01); *A61P 25/28* (2018.01); *A61P 29/00* (2018.01); *A61P 31/14* (2018.01); *A61P 35/00* (2018.01); *A61P 35/04* (2018.01)

(58) Field of Classification Search
CPC ................ A61K 47/6913; A61P 35/00; C07K 2317/569
See application file for complete search history.

(56) References Cited

FOREIGN PATENT DOCUMENTS

| | | | |
|---|---|---|---|
| CN | 106539812 | A | 3/2017 |
| CN | 106540254 | A | 3/2017 |
| CN | 106540256 | A | 3/2017 |
| CN | 106692967 | A | 5/2017 |
| CN | 106727331 | A | 5/2017 |
| CN | 108310378 | A | 7/2018 |
| CN | 110755600 | A | 2/2020 |
| WO | 2016203025 | A1 | 12/2016 |
| WO | 2018053508 | A1 | 3/2018 |
| WO | 2019123414 | A1 | 6/2019 |
| WO | WO2020014644 | * | 1/2020 ............. A61K 47/64 |

OTHER PUBLICATIONS

Bannas et al., Nanobodies and nanobody-based human heavy chain antibodies as antitumor therapeutics. Frontiers in Immunol., 8, Art. 01603, 2017. (Year: 2017).*

* cited by examiner

*Primary Examiner* — Elly-Gerald Stoica (57) ABSTRACT

A natural immune agonist complex, consisting of an immune agonist and a targeted liposome, where the immune agonist is $M(cGAMP)L_n$. The targeted liposome is formed by a nanobody targeting a tumor microenvironment, a cell membrane-targeted penetrating peptide, or a blood-brain barrier-targeted penetrating peptide with a liposome through chemical bonding. This application further provides a preparation and application of the natural immune agonist complex.

2 Claims, 3 Drawing Sheets

Specification includes a Sequence Listing.

SEQUENCE LISTING

```
Sequence total quantity: 4
SEQ ID NO: 1            moltype = AA   length = 23
FEATURE                 Location/Qualifiers
REGION                  1..23
                        note = synthesis
source                  1..23
                        mol_type = protein
                        organism = synthetic construct
SEQUENCE: 1
HGLASTLTRW AHYNALIRAF GGG                                              23

SEQ ID NO: 2            moltype = AA   length = 8
FEATURE                 Location/Qualifiers
REGION                  1..8
                        note = synthesis
source                  1..8
                        mol_type = protein
                        organism = synthetic construct
SEQUENCE: 2
CHAIYPRH                                                                8

SEQ ID NO: 3            moltype = DNA   length = 17
FEATURE                 Location/Qualifiers
misc_feature            1..17
                        note = synthesis
source                  1..17
                        mol_type = other DNA
                        organism = synthetic construct
SEQUENCE: 3
agaagcggaa tgggagc                                                     17

SEQ ID NO: 4            moltype = DNA   length = 17
FEATURE                 Location/Qualifiers
misc_feature            1..17
                        note = synthesis
source                  1..17
                        mol_type = other DNA
                        organism = synthetic construct
SEQUENCE: 4
gaggtgggtg ggaagga                                                     17
```

METHOD OF TREATMENT OF COLORECTAL, BREAST AND LUNG CANCER WITH METAL CONTAINING IMMUNE AGONIST COMPLEXES

CROSS-REFERENCE TO RELATED APPLICATIONS

This application is a continuation of International Patent Application No. PCT/CN2020/081044, filed on Mar. 25, 2020, which claims the benefit of priority from Chinese Patent Application No. 202010178179.5, filed on Mar. 14, 2020. The content of the aforementioned application, including any intervening amendments thereto, is incorporated herein by reference in its entirety.

REFERENCE TO AN ELECTRONIC SEQUENCE LISTING

The contents of the electronic sequence listing (seq-listing.xml; Size: 6,000 bytes; and Date of Creation: Oct. 24, 2022) is herein incorporated by reference in its entirety.

TECHNICAL FIELD

This application relates to biomedical technology, and more particularly to an immune agonist complex, a preparation thereof, and an application thereof in the preparation of drugs for treating coronavirus infections, tumors, Alzheimer's disease, and brain tissue injuries.

BACKGROUND

Innate immune system, as the body's first line of defense against pathogens, is composed of cells and other mechanisms capable of defending against non-specific viral infection, that is, producing non-specific recognition and response to invaders. Cellular immunity constitutes the body's second line of defense against viruses, including immune cells (such as T cells). Cells in the human body constantly present fragments of internal proteins on the surface of the cell for T cells to detect (antigen presentation), and once the T cells recognize possible viral fragments, the corresponding cells will be killed by cytotoxic T cells and virus-specific T cells. Some cells, such as macrophages, are specifically responsible for antigen presentation. Interferon (IFN) is a hormone produced by the body after viral infection, which can gradually prevent replication of the virus by killing infected cells and adjacent cells thereof. Interferon is a group of cell-signaling proteins and is a host-specific glycoprotein with antiviral function secreted by animal cells after being infected by certain viruses. The interferon secreted by the infected cells can interact with the relevant receptor on the uninfected cells therearound to facilitate the uninfected cells to synthesize the antiviral protein to prevent further infections, thereby achieving the anti-virus effect.

Both natural viral infections and attenuated viral vaccines can induce broad immunity. In addition to the humoral immunity, these vaccines can also induce cell immunity, including tissue-resident memory T cells (TRM cells) of specific tissues such as lung. However, a subtle balance is required between the safety and immunogenicity of these "replication" vaccines. Moreover, these vaccines are merely suitable for certain crowds. In contrast, a "non-replicating" viral vaccine induces poor T cell immunity in the respiratory tract and requires an effective mucosal adjuvant to overcome the immune regulation mechanism of the respiratory mucosa. Nevertheless, despite decades of research, effective mucosal adjuvants are still deficient. I-type interferons (IFN-Is) are major immune mediums for protective immunity against viral infections and may be strongly induced by the pneumonia virus infections of alveolar epithelial cells (AECs) and immune cells. Thus, the stimulator of interferon genes (STING) in the above two cells may be activated by an immune response induced by a viral infection or replication vaccine. However, it is still a huge challenge to deliver the STING agonist into the cytosol of the AEC without destroying the integrity of the active layer of the lung due to a powerful barrier formed by the lung epithelial cells that prevents nanoparticles and hydrophilic molecules from entering the lung.

Microorganisms and viral deoxyribonucleic acid (DNA) in infected mammalian cells can induce an endogenous vigorous immune response by stimulating interferon secretion. The immune response of the receptor protein (STING) of the endoplasmic reticulum (ER) to cytoplasmic DNA is necessary. Studies have shown that the cyclized cGMP-AMP dinucleotide synthetase (cGAS) endogenously catalyzes the synthesis of cGAMP under activation conditions after being combined with DNA. The cGAMP acts as a second messenger to stimulate the response of interferon INF-I through STING and mediate the activation of TBK1 and IRF-3, thereby starting the transcription of the I-type interferon INF-β gene. The STING is a transmembrane protein of the ER, and the ER has an ENPP1 hydrolase. The ENPP-1 hydrolase can degrade the agonist 2'3'-cGAMP of STING, which has a relatively wide substrate specificity, including ATP and $NAD^+$. It has been found that 2'3'-cGAMP is a good substrate for ENPP1. Therefore, the prevention of STING agonists/activator cGAMP from being hydrolyzed by ENPP1 can maintain the effective life and drug effect of the immune agonist. As a drug carrier, the nano liposome has a wide application prospect in prolonging the half-life of the drug, enhancing the drug effect, and targeting the targeted site. Unfortunately, it is still challenging to prepare the targeted nano liposome with good stability, high encapsulation rate, and easy escape of the cell-protective barrier into immune cells. To further improve the precise targeting and utilization rate of the drug, the immune targeting liposome, such as a monoclonal antibody, is used to target immune cells and tumor microenvironments. Unluckily, the monoclonal antibody is large in molecular weight, high in preparation cost, difficult for large-scale production, and exists immune response. Hence, one of the main contents of this application is to select a nanobody as a component of the targeted liposome, which has a small molecular weight, good tissue penetration ability, strong specificity, high affinity, weak immunogenicity to human, and avoids complement reaction caused by Fc segment. In addition, the nanobody used in this application should be easy to prepare, efficiently expressed by a prokaryotic system fermentation tank, low-cost, and produced on a large scale. It has been founded in this application that different nanobodies have various specificities, which are still in clinical research when used in drugs. The monoclonal nanobody of the epitope protein of the immune cell is selected in this application, or the variable region nanobody peptide fragment thereof is intercepted to be chained to the surface of the liposome through a chemical bond, so as to construct an immune agonist-nanobody-liposome complex. As experimental illustrations, some nanobodies are selected in this application, such as anti-PD-1 PD-L1, anti-MHCII, anti-CD47, and anti-TFR 1. PD-1 (Programmed Death 1) is expressed in many immune cells, such as monocytes, T cells, B cells, DC, and tumor-infiltrating lymphocytes (TILs). MHCII and PD-L1 are expressed in antigen-presenting cells (APCs). Moreover, some targeted small peptides can easily cross membranes, and targetedly cross the lung epithelial cell membrane and blood-brain barrier. To enable the STING immune agonist to effectively enter the lung immune cell and the lung epithelial cell, and pass through the blood-brain barrier, the comprehensive optimization of the effects and advantages of the immune agonist, the nanobody, the penetrating peptide, and the liposome are researched in this application, so as to obtain the novel immune agonist targeted nano drug-loaded complex. The novel immune agonist complex integrates various advantages, avoids the fast degradation of the immune agonist in vivo, and can quickly target immune cells, and tumor microenvironments, or target and penetrate the blood-brain barrier. Besides, nanobodies (or cell-penetrating peptides) that are easy to produce and low-cost are used to prepare the novel immune agonist targeted liposome complex. Active immunity and immune escape prevention are combined in this application. The effects of the novel immune agonist complex on resisting coronavirus replication, viral inflammation, tumor, and neurodegenerative diseases (such as Alzheimer's disease) are researched in this application. In addition, the effects of the novel immune agonist complex are also studied when used as an antiviral vaccine adjuvant, an anti-tumor vaccine adjuvant, or a therapeutic vaccine.

Recently, Corona Virus Disease 2019 (COVID-19) has been detected in Wuhan, China, in December 2019 and then rapidly erupted. As of early March 2020, more than 100,000 people have been infected and more than 3,000 deaths have been reported worldwide, mainly distributed in Wuhan, Hubei Province, China, and in about 100 countries and regions abroad. The epidemic is threatening and spreading around the world. Global epidemic prevention and control have become a top priority. At present, there is no specific treatment for COVID-19. Since the outbreak of COVID-19, the therapies and drugs that might be effective against COVID-19 have been raised much attention by health care workers, academics, and the general public. At present, there has been still no specific treatments, preventive drugs, and vaccines with clear efficacy for COVID-19. The State Council issues the "notice on standardizing medical institutions' clinical research on drug therapy for COVID-19" to support qualified hospitals to carry out clinical research on related drugs. To find a specific drug for COVID-19, more than 80 clinical trials of drugs, including Chinese and western medicines, have been launched. Although some drugs show initial efficacy, final clinical results are still pending. Hence, it is urgent to develop innovative and specific anti-coronavirus drugs and vaccines.

Cancer is a leading cause of death worldwide, which is characterized by excessive cell proliferation and abnormal differentiation. It is estimated by World Health Organization (WHO) that by 2020, there will be about 20 million new cancer cases and 12 million cancer-related deaths. Cancer will become the first killer of human beings in this century and pose the most serious threat to human survival. In recent years, tumor immunotherapy is a new revolution in cancer therapy, including immune detection point inhibitor drugs, and cellular immunotherapy. The immune agonist cGAMP has been confirmed to be used in antiviral immunity and anti-tumor. Active immunotherapy is a rising star that induces the activation of cytotoxic T cells to kill tumors by immune activation or strengthening of natural immune pathways. In the interferon-stimulating signaling pathway, that is, the STING pathway, cGAMP is combined with STING to activate the transcription factor IRF3 and produce β interferon, activate a variety of cytokines to up-regulate expression, and activate immune presenting cells, thereby activating T cells and killing tumor cells. cGAMP is a secondary signaling molecule, which is rapidly degraded in vivo, thus seriously affecting its efficacy. To improve the anti-tumor efficacy of the immune agonist, the comprehensive optimization of the effects and advantages of the immune agonist, the nanobody, the penetrating peptide, and the liposome are studied in this application, to obtain the novel immune agonist complex. The novel immune agonist complex integrates active immunity and immune escape. Compared with the immune agonist, the novel immune agonist complex shows a significantly enhanced efficacy, which is an ideal innovative anti-tumor drug with potential anti-tumor clinical application prospects.

Alzheimer's Disease (AD) has become one of the most severe diseases worldwide. The existing AD patients are nearly 50 million people all over the world, but anti-AD drugs approved by the United States FDA and China CFDA are rare. Moreover, most anti-AD drugs do cure the symptoms, not the disease, and present poor efficacy. Most anti-AD drugs are still in the pre-clinical and clinical stages, mainly acting on neural signaling pathways and Aβ amyloid plaques. Unfortunately, there are many patients and the demand for drugs is enormous. Specifically, the prevalence of AD in people aged 65 years and older reaches 4.8%, and increases by double for each increase in age of 5 years. The prevalence of AD in people aged over 85 years reaches 28.9%. The drug market for AD treatment in eight major countries, including the United States and Japan, has reached more than 10 billion US dollars and increases year by year.

AD is first reported by the German scholar Alosi Alzheimer in 1907. The most typical pathological features of AD are the presence of large numbers of amyloid plaques (senile plaques (SP)), neurofibrillary tangles (NFTs), decreased neuronal numbers, and granular vacuole degeneration in the cerebral cortex and hippocampal tissues. The pathogenesis of AD is complex and may be the result of a multi-factor interaction. So far, the exact pathogenesis of AD is still a mystery. Luckily, in the past three decades, it has been found that a homeostasis equilibrium among amyloid peptide (Aβ), amyloid precursor protein (APP), and brain homeostasis regulatory protein and associated metal ions thereof is closely related to the occurrence and development of AD. It is reported in a breakthrough study by the University of Bonn in Germany that AD is caused by inflammation of immune cells in the brain. Previously, the cause and pathogenesis of AD have not been fully determined by humans, and this discovery is undoubtedly significant. Scientists predict that the discovery provides new ideas for the development of anti-AD drugs, and humans may cure or even prevent AD within the next five years. The findings have been published in Nature, which is the top scientific journal worldwide. The team of professor Michael Heneka of the University of Bonn in Germany believes that in the AD process involved with inflammation, β-amyloid plaques are caused by inflammation.

In recent years, large-scale exon sequencing research finds that the mutation of many small glial cell genes is related to the risk of AD incidence, and brain immune dysfunction can be related to the pathological process of AD. The most representative discovery is that the triggering receptor expressed on Myeloid cells-2 (TREM2) is found to be a common risk gene for several neurodegenerative diseases. The mutation of coding region R47H of the TREM2 will increase the incidence risk of AD by nearly 3 times, as well as frontal temporal lobe dementia, amyotrophic lateral sclerosis, and Parkinson's disease. TREM2 is specifically expressed in microglial cells in the brain, and its mutation is highly correlated with the incidence risk of AD. TREM2 receptor proteins in immune cells of the brain can interact with toxic β-amyloid (Aβ) and activate neural immune cells (microglial cells) to clear Aβ, thereby potentially delaying the progression of AD pathogenesis. However, how the TREM2 participates and affects the AD pathological process is not clear enough.

The natural immune pathway (STING pathway) is a stimulation pathway of an I-type interferon gene, and the immune response of endoplasmic reticulum (ER) receptor proteins (stimulator of interferon genes, STING) to cytoplasmic DNA is required. The cyclic dinucleotide cGAMP is the only STING agonist found so far that can directly activate both murine and human STING proteins. Agonists are chemicals or drugs that bind to protein molecules of receptors or signal transduction pathways on cells and produce the chemicals or drugs with the typical physiological efficacy of natural substances. The cyclic dinucleotide cGAMP, as a natural immune agonist of STING, is capable of inducing the production of I-type interferon. Therefore, natural immune pathway activators are promising for the treatment of AD and neurodegenerative diseases, which requires experimental and clinical validation.

The blood-brain barrier is capable of selectively blocking the entry of substances from the peripheral blood into the brain, which is essential for maintaining a stable environment in the brain, but at the same time hinders the delivery of therapeutic drugs to the brain. Commonly, small molecules with a molecular weight of fewer than 600 Da can selectively pass through the blood-brain barrier. Passive brain-targeted drug delivery systems can increase drug concentrations in the brain by enhancing affinity with blood-brain barrier cells and weakening the excretion of P-glycosyl proteins to drugs. The active brain targeted drug delivery system obtained by combining specific ligands or nanobodies on the passive targeted drug delivery system can more accurately realize the targeted delivery of drugs to the brain.

Cyclic dinucleotide cGAMP, a natural immune agonist of STING, activates brain tissue immune cells and may be effective in treating AD. However, cGAMP is a secondary signaling molecule that metabolizes quickly in vivo, seriously affecting its efficacy time. In addition, cGAMP has a molecular weight of nearly 800 Da, which is difficult to pass through the blood-brain barrier of the brain, and is easily degraded. To enable cGAMP effectively penetrate the blood-brain barrier and deliver drugs to brain immune cells to interact with STING, a novel immune agonist complex is provided in this application, which exhibits significantly enhanced efficacy for treating brain diseases, such as AD mice, cerebrovascular injury/head injury, compared with the immune agonist.

SUMMARY

An object of the present disclosure is to provide a natural immune agonist complex, including a novel immune agonist and a targeted nano-carrier. Specifically, the novel natural immune agonist, a targeted nanobody/transmembrane polypeptide and a liposome are combined to exhibit significantly improved performance and efficacy compared with the single immune agonist. The novel immune agonist complex provided herein can effectively activate the type I interferon signaling pathway, and significantly induce humoral immunity and cellular immunity (including memory T cells), thereby significantly enhancing the immune function in vivo. Moreover, it can contribute to the inhibition of coronavirus replication, viral inflammation, the growth of solid tumors, and metastatic cancer, significantly improve the cognitive function of mice suffering from Alzheimer's disease (AD), effectively mitigate brain amyloid plaques and brain inflammation of the mice suffering from the AD, and has obvious therapeutical effects on brain diseases such as ischemic cerebrovascular and craniocerebral injury. Therefore, the novel immune agonist complex provided herein has a good application prospect in the preparation of drugs for treating viral inflammation, tumors, neurodegenerative diseases (i.e., AD), and brain injuries. In addition, it can also be applied to antiviral vaccine adjuvants (mucosal adjuvants) or antiviral (anti-tumor) therapeutic vaccines.

Technical solutions of this application are described as follows.

In a first aspect, this application provides an immune agonist complex, wherein the immune agonist complex consists of a natural immune agonist and a targeted liposome; the targeted liposome is formed by a nanobody targeting a tumor microenvironment, a cell membrane-targeted penetrating peptide, or a blood-brain barrier-targeted penetrating peptide with a liposome through chemical bonding; and the natural immune agonist is $M(cGAMP)L_n$, wherein M is an ion of a transition metal; L is a ligand containing 0, N or S, and n is selected from 0-2.

In an embodiment, the transition metal is selected from the group consisting of zinc, manganese, copper, and ruthenium; the nanobody is an anti-programmer death-1 (anti-PD-1) nanobody, an anti-programmed death ligand-1 (anti-PDL-1) nanobody, an anti-CD-47 nanobody, or an anti-transferrin receptor 1 (anti-TfR1) nanobody; the ligand is selected from the group consisting of 5-fluorouracil, imidazole, gemcitabine, capecitabine, water, and 6-mercaptopurine; the cell membrane-targeted penetrating peptide is gH625 consisting of SEQ ID NO: 1; and the blood-brain barrier-targeted penetrating peptide is PT8 consisting of SEQ ID NO: 2.

In an embodiment, the immune agonist complex is selected from the group consisting of:

MncGAMP-anti-human PD-1 nanobody-liposome (complex I);

MncGAMP-anti-human PD-L1 nanobody-liposome (complex II);

MncGAMP-anti-human CD47 nanobody-liposome (complex III);

MncGAMP-anti-mouse PD-1 nanobody-liposome (complex IV);

MncGAMP-anti-mouse PD-L1 nanobody-liposome (complex V);

MncGAMP-anti-mouse CD47 nanobody-liposome (complex VI);

ZncGAMP-gH625-liposome (complex VII);

ZncGAMP-anti-mouse TfR1 nanobody-liposome (complex IX); and

ZncGAMP-gH625-PT8-liposome (complex X).

In a second aspect, this application provides a method of preparing the immune agonist complex, comprising:

preparing the natural immune agonist $M(cGAMP)L_n$;

preparing the nanobody;

subjecting the nanobody to terminal thiolation to obtain a terminally-thiolated nanobody;
preparing an unilamellar liposome; and
adding the natural immune agonist M(cGAMP)$L_n$ and the terminally-thiolated nanobody to the unilamellar liposome in sequence followed by incubation to obtain the immune agonist complex.

In an embodiment, the natural immune agonist M(cGAMP)$L_n$ is prepared through steps of: reacting cGAMP with a transition metal salt under stirring and heating in the presence of the ligand followed by purification using an ion-exchange column to obtain the natural immune agonist M(cGAMP)$L_n$.

In an embodiment, the nanobody is prepared by using an *Escherichia coli* (*E. coli*) expression system.

In an embodiment, the terminal thiolation is performed through steps of:
adding ethylene diamine tetraacetic acid (EDTA) to a solution of the nanobody to obtain a mixture, wherein a concentration of the EDTA in the mixture is 5 mM;
adding a thiolation reagent dropwise into the mixture followed by incubation in the dark for 1 h, wherein the thiolation reagent is Traut's reagent; and
removing excess thiolation reagent by using a de-salting column to obtain the terminally-thiolated nanobody.

In an embodiment, the unilamellar liposome is prepared through steps of:
dissolving lecithin, cholesterol, and 1,2-distearoyl-SN-glycerol-3-phosphorylethanolamine-N-maleimide-polyethylene glycol in chloroform followed by vacuum rotary evaporation in a water bath and addition of $(NH_4)_2SO_4$ to obtain the unilamellar liposome.

In a third aspect, this application provides a method for treating a tumor in a subject in need thereof, comprising:
administering a therapeutically effective amount of the immune agonist complex to the subject;
wherein the tumor is selected from the group consisting of colorectal cancer, breast cancer, ovarian cancer, prostate cancer, pancreatic cancer, testicular cancer, lung cancer, nasopharyngeal carcinoma, esophageal cancer, kidney cancer, glioma, melanoma, malignant lymphoma, head and neck cancer, thyroid cancer, and osteosarcoma; and
an administration route is selected from the group consisting of intravenous injection, intramuscular injection, subcutaneous injection, intravenous drip, intranasal drip, oral administration, and a combination thereof.

In a fourth aspect, this application provides a method for treating viral infection in a subject in need thereof, comprising:
administering a therapeutically effective amount of the immune agonist complex to the subject;
wherein the viral infection is caused by coronavirus, influenza virus, or human immunodeficiency virus (HIV); and
an administration route is selected from the group consisting of intravenous injection, intramuscular injection, subcutaneous injection, intravenous drip, intranasal drip, oral administration, and a combination thereof.

In a fifth aspect, this application provides a method for treating viral inflammation in a subject in need thereof, comprising:
administering a therapeutically effective amount of the immune agonist complex to the subject;
wherein the viral inflammation is Corona Virus Disease 2019 (COVID-19), viral nephritis, viral encephalitis, viral enteritis, or viral hepatitis; and
an administration route is selected from the group consisting of intravenous injection, intramuscular injection, subcutaneous injection, intravenous drip, intranasal drip, oral administration, and a combination thereof.

In a sixth aspect, this application provides a method for treating tumor metastasis in a subject in need thereof, comprising:
administering a therapeutically effective amount of the immune agonist complex to the subject;
wherein the tumor metastasis is lung metastasis, liver metastasis, lymphatic metastasis, or brain metastasis; and
an administration route is selected from the group consisting of intravenous injection, intramuscular injection, subcutaneous injection, intravenous drip, intranasal drip, oral administration, and a combination thereof.

In a seventh aspect, this application provides a method for treating a neurodegenerative disease in a subject in need thereof, comprising:
administering a therapeutically effective amount of the immune agonist complex to the subject;
wherein the neurodegenerative disease is Alzheimer's disease (AD), Parkinson's disease (PD), amyotrophic lateral sclerosis (ALS), multiple sclerosis, ataxia telangiectasia (AT), bovine spongiform encephalopathy (BSE), Creutzfeldt-Jakob disease (CJD), Huntington's disease, spinocerebellar atrophy, spinal muscular atrophy, spastic paraplegia, or myasthenia gravis; and an administration route is selected from the group consisting of intravenous injection, intramuscular injection, subcutaneous injection, intravenous drip, intranasal drip, oral administration, and a combination thereof.

In an eighth aspect, this application provides a method for treating a brain disease in a subject in need thereof, comprising:
administering a therapeutically effective amount of the immune agonist complex to the subject;
wherein the brain disease is ischemic cerebrovascular injury, craniocerebral injury, encephalitis, or brain tumor; and
an administration route is selected from the group consisting of intravenous injection, intramuscular injection, subcutaneous injection, intravenous drip, intranasal drip, oral administration, and a combination thereof.

In a ninth aspect, this application provides a pharmaceutical composition, comprising:
the immune agonist complex; and
a pharmaceutically acceptable excipient;
wherein the pharmaceutical composition is in a form of injection, drop or oral preparation.

Unless otherwise specified, the term "cyclic dinucleotide cGAMP (namely 2'3'-cGAMP)" described herein refers to $C_{20}H_{22}N_{10}O_{13}P_2 \cdot 2NH_4$.

Unless otherwise specified, the term "STING" used herein, as a specific protein, is consistent with most public literatures, NCBI database, and European gene database. The gene name of "STING" is TMEM173, and the gene identification (ID) is 340061. Other disclosed names of "STING" include transmembrane protein 173, EMS, MITA, MPYS, NET23, SAVI, STING, hMITA, and hSTING.

The STING agonists described herein include but are not limited to cGAMP (namely 2'3'-cGAMP, or c-AMP-GMP), c-di-AMP, c-di-GMP, c-di-IMP, c-GMP-IMP and substituted derivatives and mixtures thereof. The natural immune agonist refers to a STING agonist-transition metal complex.

Brain-targeted nanobodies refer to nanobodies targeting blood-brain barrier receptor proteins. For example, the nanobody targeting the transferrin receptor is a variable region of the transferrin receptor 1 (TfR1) monoclonal nanobody.

Targeted peptides refer to cell-penetrating peptides that target the blood-brain barrier or lung epithelial cells, such as gH625 cell-penetrating peptide and a small peptide with affinity for the transferrin receptor. The gH625 peptide consists of 23 amino acid residues (H₂N-HGLASTLTR-WAHYNALIRAFGGG-CONH₂, SEQ ID NO: 1) with a molecular weight of 2461 Da. The small peptide with affinity for the transferrin receptor is PT8 consisting of eight amino acids (H₂N-CHAIYPRH-CONH₂, SEQ ID NO: 2), which binds to a surface cavity of the transferrin receptor, where the binding site is different from that of transferrin.

DETAILED DESCRIPTION OF EMBODIMENTS

The present application will be clearly and completely described below with reference to the embodiments. Obviously, described below are intended to better illustrate the present application, rather than limit the scope of the present application.

Example 1 Preparation of a Novel Immune Agonist Complex (S1) Synthesis of Immune Agonist and Metal Complex Thereof The cyclic dinucleotide cGAMP was synthesized under the catalysis of a cyclic GMP-AMP synthetase (cGAS), and had a purity of above 98%. An immune agonist metal complex ([M(cGAMP)L$_{0.2}$]) was prepared through reaction of a transition metal salt and the immune agonist (i.e., cGAMP) under stirring and heating in the presence of the small-molecular ligand followed by purification by using an ion exchange column, where M was a transition metal ion, i.e., Zn, Mn, Cu, or Ru; and L was a small-molecular ligand containing O, N or S, such as 5-fluorouracil, imidazole, gemcitabine, capecitabine, water, and 6-mercaptopurine. The immune agonist metal complex was analyzed for the metal content and element composition.

Figure 1A:
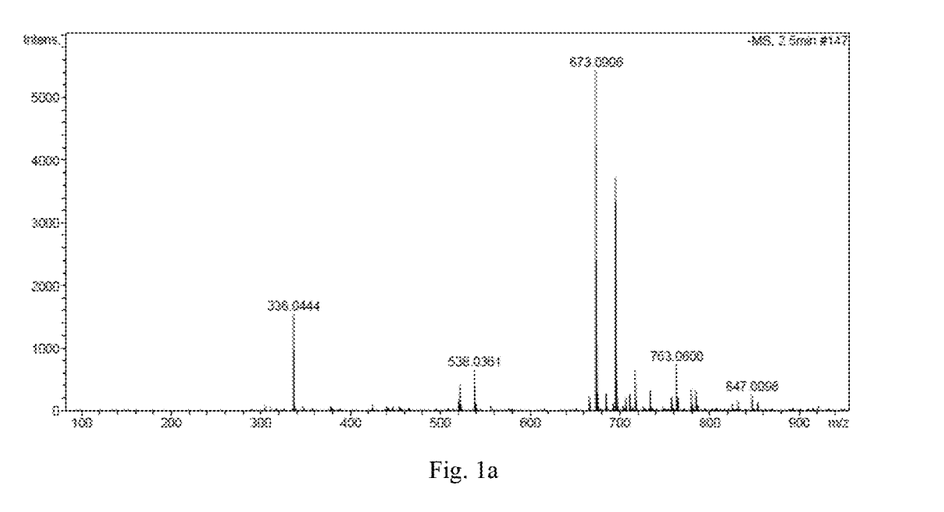
FIG. 1a is a mass spectrum of a natural immune agonist MncGAMP according to an embodiment of the present disclosure.
Figure 1B:
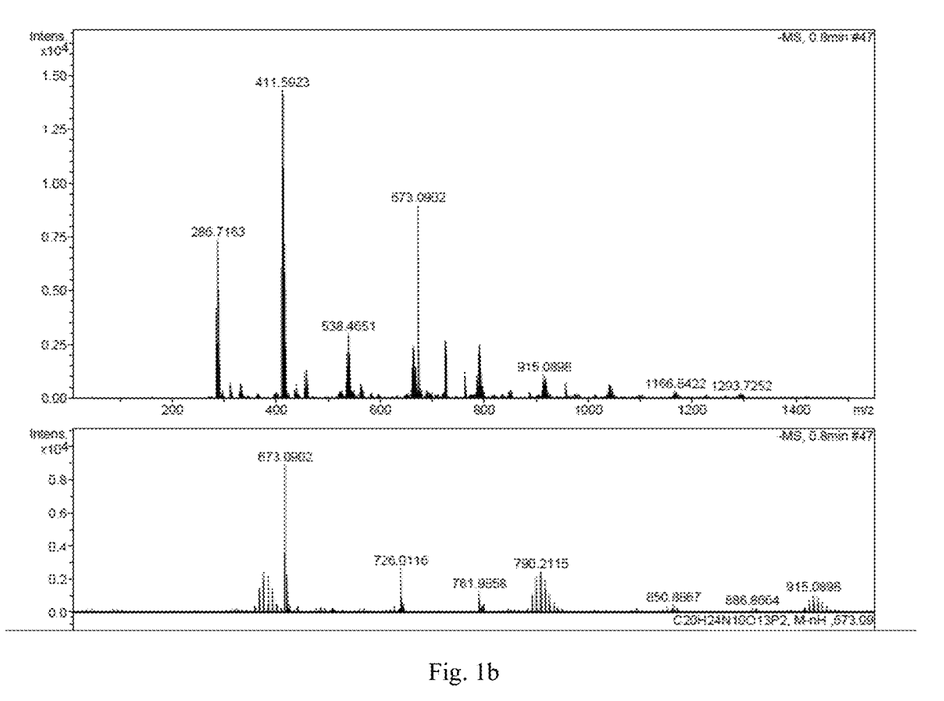
FIG. 1b is a mass spectrum of a natural immune agonist ZncGAMP according to an embodiment of the present disclosure.

FIGS. 1a and 1b were respectively mass spectra of MncGAMP and ZncGAMP, where the peak at m/z 673.09 corresponded to the peak of cGAMP anion, shown as:

Exact Mass: 673.09

Figure 2A:
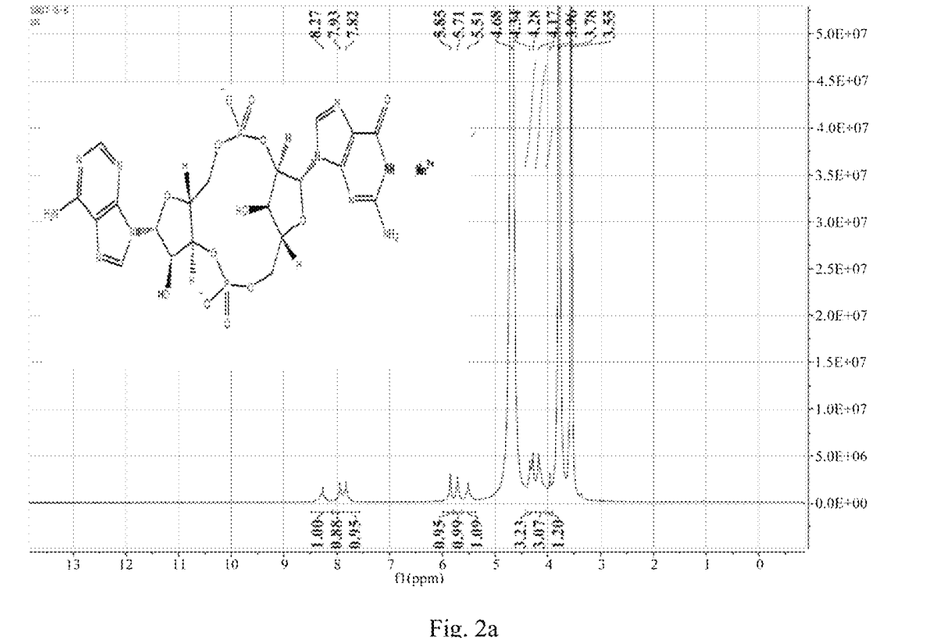
FIG. 2a is a nuclear magnetic resonance (NMR) spectrum of the natural immune agonist MncGAMP according to an embodiment of the present disclosure.
Figure 2B:
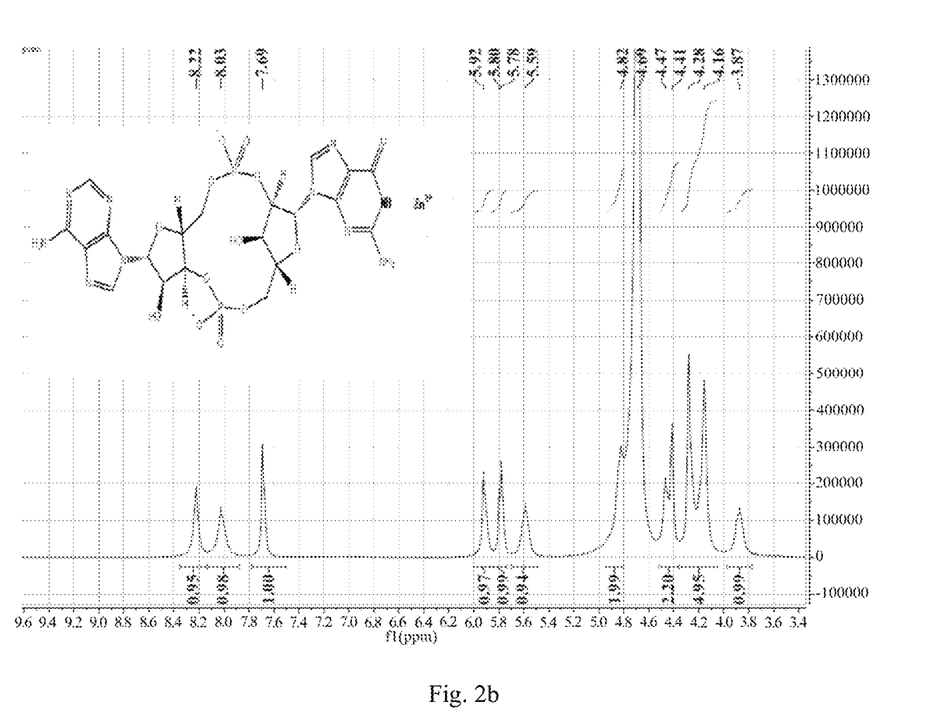
FIG. 2b is an NMR spectrum of the natural immune agonist ZncGAMP according to an embodiment of the present disclosure.

NMR spectra of MncGAMP and ZncGAMP were respectively shown in FIGS. 2a and 2b, characterized as:

MncGAMP: ¹H NMR (400 MHz, D₂O) δ 8.27 (s, 1H), 7.93 (s, 1H), 7.82 (s, 1H), 5.85 (s, 1H), 5.71 (s, 1H), 5.51 (s, 1H), 4.31 (d, J=21.3 Hz, 3H), 4.17 (s, 3H), 3.96 (s, 1H); and ZncGAMP: ¹H NMR (400 MHz, D₂O) δ 8.22 (s, 1H), 8.03 (s, 1H), 7.69 (s, 1H), 5.92 (s, 1H), 5.79 (d, J=7.7 Hz, 1H), 5.59 (s, 1H), 4.82 (s, 2H), 4.44 (d, J=21.7 Hz, 2H), 4.22 (d, J=49.6 Hz, 5H), 3.87 (s, 1H).

(S2) Preparation of a Nanobody

Nanobodies (e.g., anti-PD1, anti-PDL1, anti-CD47, and anti-TfR1 nanobodies) were human (mouse) monoclonal nanobodies, where the plasmid adopted PET-22 B (+) as a carrier, carrying AMP+resistance, and a terminal of the protein sequence was marked with 6 His-Tag to facilitate the purification. The nanobodies were efficiently expressed by *Escherichia coli*, and purified by an affinity column with a purity of 98%. The freeze-dried powder was stored in an ultra-low temperature refrigerator for later use. The targeted penetrating peptides were synthesized by a biotechnological company.

(S3) Preparation of Nanobody/Penetrating Peptide-Liposome-Immune Agonist Complexes A nanobody/penetrating peptide was subjected to terminal thiolation. After that, a solution of the nanobody was added with ethylene diamine tetraacetic acid (EDTA) to form a mixture, where a concentration of the EDTA in the mixture was 5 mM. The mixture was then added with a thiolation reagent (Traut's reagent) under stirring. The thiol groups on the nanobody were determined by Ellman's method to verify the successful thiolation of the nanobody. Liposomal materials (including lecithin, cholesterol, and 1,2-distearoyl-SN-glycerol-3-phosphorylethanolamine-N-maleimide-polyethylene glycol 2000) were dissolved in chloroform and dried into a film by vacuum rotary evaporation in a water bath followed by addition of (NH₄)₂SO₄ for hydration to obtain a unilamellar liposome. A blank liposome was added with an immune agonist/immune agonist metal complex and the terminally-thiolated nanobody followed by incubation in the dark overnight and removal of unencapsulated drug and unattached nanobody proteins by a molecular sieve column to obtain the immune agonist complex. The immune agonist complex was examined by transmission electron microscope (TEM), which had bilayer round vesicles, good morphology, liposome diameter of about 200 nm, and zeta potential of about 24 mV. The immune agonist complex had an immune agonist encapsulation rate of 80%, and was stable under refrigeration at 4° C. The lyophilized powder of 3% trehalose solution was stored under refrigeration. The novel immune agonist complexes prepared in Example 1 were as follows:

MncGAMP-anti-human PD-1 nanobody-liposome (complex I);

MncGAMP-anti-human PD-L1 nanobody-liposome (complex II);
MncGAMP-anti-human CD47 nanobody-liposome (complex III);
MncGAMP-anti-mouse PD-1 nanobody-liposome (complex IV);
MncGAMP-anti-mouse PD-L1 nanobody-liposome (complex V);
MncGAMP-anti-mouse CD47 nanobody-liposome (complex VI);
ZncGAMP-gH625-liposome (complex VII);
McGAMP-liposome (M=Mn/Zn) (complex VIII)
ZncGAMP-anti-mouse TfR1 nanobody-liposome (complex IX); and
ZncGAMP-gH625-PT8-liposome (complex X).

Example 2 Evaluation of Antitumor Effects of Novel Immune Agonist Complexes

Experimental Animals

Specific pathogen free (SPF)-grade BALB/C and $C_{57}BL/6$ male mice, aged 7-8 weeks and weighing 20-22 g, were purchased from Shanghai Slac Laboratory Animal Co., Ltd (Laboratory animal quality certificate number: SCXK (Shanghai)2007-0005.

Feeding Conditions

All mice were fed freely with sterilized food and water, and kept at room temperature (23±2° C.), where the entire feeding process met the requirements of SPF grade.

Dose Design

Mice were injected intraperitoneally with the immune agonist or complex with a dose of 10 mg/kg, or each injected intraperitoneally with 200 μg of the nanobody.

Control Test

Negative control: PBS solution.
Positive control: cGAMP with a dose of 10 mg/kg.

Administration

Administration route: intraperitoneal injection.
Dose of the novel immune agonist complex: 100 μL/each mouse.
Dose of the nanobody (anti-PD-L1, anti-CD47, and anti-TfR1 nanobody): 200 μg/each mouse.
Frequency: once a day for consecutive 21 days.
The number of mice in each group: 10.

Cell Material

Murine colorectal cancer cell line CT26, murine breast cancer cell line 4T1, and murine lung cancer cell line LL/2 were all purchased from the Cell Bank of the Chinese Academy of Sciences.

Experimental Procedures

Establishment and Intervention of Tumor Model Mice

Cancer cells were cultured, passaged, collected at the logarithmic phase of cells, and prepared into a cell suspension at a concentration of $(1.0 \times 10^7)$ per ml. Mice were injected with 0.2 ml of the cell suspension at the axilla of the right forelimb (cell number 2.0×106 cells/each), and were tumorigenic in about 8 days. These mice were randomly divided into 10 groups equally, namely, group A: negative control group (saline group), group B: positive control (cGAMP) group (dose: 10 mg/kg), group C: MncGAMP group (dose: 10 mg/kg), group D: anti-PD-L1 nanobody group, group E: anti-CD47 nanobody group, group F: anti-TfR1 nanobody group, group G: complex V group (dose: 10 mg/kg), group H: complex VI group (dose: 10 mg/kg), group I: complex IX group (dose: 10 mg/kg), and group J: complex VIII group (10 mg/kg). The mice were administered once a day for consecutive 21 days. 21 days later, the mice were executed and the tumor weights were weighed, and the tumor inhibition rate was calculated by: [1−average tumor weight of experimental groups (groups B, C, D, E, F, G, H, I, and J)/average tumor weight of group A]]×100%.

Murine colorectal cancer cell line CT26 was prepared and transplanted into the BA1B/C mice, murine breast cancer cell line 4T1 was prepared and transplanted into BA1B/C mice, and murine lung cancer Lewis tumor line LL/2 was prepared and transplanted into $C_{57}BL/6$ mice to evaluate the anti-tumor effects of different drugs.

Statistical Analysis

The data were expressed as x±s and processed by SPSS10.0 software. One-way ANOVA test was used to compare the significance of the difference in tumor weight among the groups, and the significance level (a) was 0.05.

Experimental Results

A subcutaneous transplantation tumor model was prepared by subcutaneous inoculation of tumor cells in mice. The novel immune agonist complexes prepared herein all significantly inhibited the growth of the tumor, and the tumor weights were significantly lower than those of the negative control group ($P<0.05$, $P<0.01$) after 21 days of the administration, indicating that the immune agonist complexes had greatly improved antitumor effects. The specific results were shown in Table 1.

TABLE 1

Inhibition effect of novel immune agonist complexes on BALB/C mice transplanted with colorectal cancer cell line CT26 (n = 10, mean ± SD)

| Groups | Average tumor weight (g) | Average tumor inhibition rate (%) |
|---|---|---|
| Negative control group | 2.244 ± 0.266 | — |
| Positive control (cGAMP) group | 0.784 ± 0.135 | 65.0 |
| MncGAMP group | 0.493 ± 0.203 | 78.0 |
| MncGAMP-Lipo (complex VIII) group | 0.404 ± 0.187 | 81.9 |
| Anti-PD-L1 nanobody group | 1.773 ± 0.185 | 22.7 |
| Anti-CD47 nanobody group | 1.907 ± 0.205 | 15.0 |
| Anti-TfR1 nanobody group | 1.819 ± 0.195 | 18.9 |
| Complex V group | 0.165 ± 0.103 | 92.6 |
| Complex VI group | 0.218 ± 0.116 | 90.3 |
| Complex IX group | 0.309 ± 0.128 | 86.2 |

Noted:
*$P < 0.05$ vs negative control group; and **$P < 0.01$ vs negative control group.

TABLE 2

Inhibition effect of novel immune agonist complexes on C57BL/6 mice transplanted with lung cancer Lewis tumor line LL/2 (n = 10, mean ± SD)

| Groups | Average tumor weight (g) | Average tumor inhibition rate (%) |
|---|---|---|
| Negative control group | 2.846 ± 0.208 | — |
| Positive control (cGAMP) group | 1.138 ± 0.127 | 60.0 |
| MncGAMP group | 0.578 ± 0.212 | 79.7 |
| Complex VIII group | 0.512 ± 0.207 | 82.0 |
| Anti-PD-L1 nanobody group | 2.217 ± 0.156 | 22.1 |
| Anti-CD47 nanobody group | 1.995 ± 0.212 | 29.9 |
| Anti-TfR1 nanobody group | 2.277 ± 0.168 | 19.9 |

TABLE 2-continued

Inhibition effect of novel immune agonist complexes on C57BL/6
mice transplanted with lung cancer Lewis tumor line LL/2
(n = 10, mean ± SD)

| Groups | Average tumor weight (g) | Average tumor inhibition rate (%) |
|---|---|---|
| Complex V group | 0.316 ± 0.206 | 88.9 |
| Complex VI group | 0.285 ± 0.163 | 90.0 |
| Complex IX group | 0.365 ± 0.124 | 87.2 |

Noted:
*$P < 0.05$ vs negative control group; and **$P < 0.01$ vs negative control group.

TABLE 3

Inhibition effect of novel immune agonist complexes on BALB/C
mice transplanted with breast cancer cell line 4T1
(n = 10, mean ± SD)

| Groups | Average tumor weight (g) | Average tumor inhibition rate (%) |
|---|---|---|
| Negative control group | 2.268 ± 0.282 | — |
| Positive control (cGAMP) group | 0.862 ± 0.156 | 61.9 |
| MncGAMP group | 0.463 ± 0.197 | 79.6 |
| Complex VIII group | 0.384 ± 0.201 | 83.1 |
| Anti-PD-L1 nanobody group | 1.856 ± 0.215 | 18.2 |
| Anti-CD47 nanobody group | 1.808 ± 0.208 | 20.3 |
| Anti-TfR1 nanobody group | 1.915 ± 0.184 | 15.6 |
| Complex V group | 0.286 ± 0.162 | 87.4 |
| Complex VI group | 0.208 ± 0.186 | 90.8 |
| Complex IX group | 0.317 ± 0.201 | 86.0 |

Noted:
*$P < 0.05$ vs negative control group; and **$P < 0.01$ vs negative control group.

Example 3 Evaluation of Metastasis of Murine Breast Cancer 4T1-Luc of Novel Immune Agonist Complexes Experimental Animals Specific pathogen free (SPF)-grade BALB/C male mice, aged 7-8 weeks and weighing 20-22 g, were purchased from Shanghai Slac Laboratory Animal Co., Ltd (Laboratory animal quality certificate number: SCXK (Shanghai)2007-0005.

Feeding Conditions

All mice were fed freely with sterilized food and water, and kept at room temperature (23±2° C.), where the entire feeding process met the requirements of SPF grade.

Dose Design

Mice were injected intraperitoneally with the immune agonist complex or MncGAMP with a dose of 10 mg/kg, or each injected intraperitoneally with 200 μg of the nanobody.

Control Test

Negative control: PBS solution.
Positive control: cGAMP with a dose of 10 mg/kg.

Administration

Administration route: intraperitoneal injection.
Dose of the novel immune agonist complex or MncGAMP: 100 μL/each mouse.
Dose of the nanobody (anti-PD-L1 and anti-CD47 nanobodies): 200 μg/each mouse.
Frequency: once a day for consecutive 21 days.
The number of mice in each group: 10.

Cell Material

Used herein was murine breast cancer cell line 4T1-luc (luciferase labeled tumor cells), which was provided by medical department of Zhejiang University School. The 4T1-luc cell line in BALB/C mice had similar growth and metastatic properties to breast tumors in humans, which was an animal model for VI-stage breast cancer in humans. The 4T1-luc cell line spontaneously produced highly metastatic tumors that metastasize to the lung, liver, lymph nodes, and brain, while forming the primary site at the injection site. Luciferase was a general term for a class of enzymes in living organisms that catalyze the oxidative luminescence of luciferin or firefly aldehyde, which was derived from organisms naturally capable of luminescence.

Experimental Procedures (1) Establishment and Intervention of Tumor Model Mice.

Cancer cells were cultured, passaged, collected at the logarithmic phase of cells, and prepared into a cell suspension at a concentration of $(1.0 \times 10^7)$ per ml. Mice were injected with 0.2 ml of the cell suspension at the axilla of the right forelimb $(2.0 \times 10^6$ cells/each), and were injected with drugs the day after inoculation with breast cancer cells. These mice were randomly divided into 9 groups equally, namely, group A: negative control group (saline group), group B: positive control (cGAMP) group (dose: 10 mg/kg), group C: complex VIII group (dose: 10 mg/kg), group D: anti-PD-L1 nanobody group, group E: anti-CD47 nanobody group, group F: anti-TfR1 nanobody group, group G: complex V group (dose: 10 mg/kg), group H: complex VI group (dose: 10 mg/kg), group I: complex IX group (dose: 10 mg/kg). The mice were administered once a day for consecutive 30 days.

(2) Detection of Effects of Different Drugs on Anti-Metastasis of Breast Cancer

Metastasis of murine breast cancer in mice was detected using a small animal in vivo optical imaging system (Perkin Elmer, IVIS Lumina XRMS Series III) on days 5, 10, 20, and 30 after drug administration, respectively, which was done at Shanghai Medical College of Fudan University. The effects of different drugs on anti-metastasis of murine breast cancer were summarized in Table 4.

TABLE 4

Effects of different drugs on anti-tumor metastasis of breast cancer

| Groups | Day 5 | Day 10 | Day 20 | Day 30 |
|---|---|---|---|---|
| Negative control group | No | Lung | Lung, liver, and hindquarter | Lung, liver, hindquarter, and brain |
| Positive control (cGAMP) group | No | No | No | Hindquarter and hind leg |
| Complex VIII group | No | No | No | hindquarter |
| Anti-PD-L1 nanobody group | No | No | Lung and hindquarter | Lung, hindquarter, and brain |
| Anti-CD47 nanobody group | No | No | Lung and hindquarter | Lung, hindquarter, and hind leg |
| Anti-TfR1 nanobody group | No | No | Lung and hindquarter | Lung and hindquarter |
| Complex V group | No | No | No | No |
| Complex VI group | No | No | No | No |
| Complex IX group | No | No | No | No |

The experimental results showed that the novel immune agonist complexes were significantly superior to the immune agonists and metal complexes thereof alone, and even better than the nanobody (anti-PD-L1 or anti-CD47) alone, in anti-metastasis of murine breast cancer 4T1-Luc on BALB/C mice. Therefore, the novel immune agonist complexes prepared herein had potential clinical application against tumor metastasis.

Example 4 Inhibition Effects of Novel Immune Agonist Complexes on Coronavirus Replication Peripheral blood mononuclear cells (PBMCs) used herein was purchased from Shanghai Saili biotechnology Co., Ltd, which mainly included lymphocytes (T cells/B cells), monocytes, macrophages, and dendritic cells. Most of PBMCs were lymphocytes. PBMCs were normal primary cells, which belonged to a mixed system.

Cells freezing conditions: 90% complete medium was added with 10% DMSO, and stored in liquid nitrogen.

Quality control (QC) tests confirmed that the culture system was free of HIV-1, HBV, HCV, *mycoplasma*, bacteria, yeast, and fungi.

The virus strain used herein was coronavirus (ATCC VR-841), which was suitable for laboratory use and purchased from ATCC company. It was a bronchopneumonia coronavirus. Virus experiments in this study were performed by virus laboratory of American Animals Inc.

Culture operations of PBMCs were described below.

(1) Cell Thawing

The frozen tube containing 1 mL of cell suspension was thawed by shaking rapidly in a 37° C. water bath, added with 4 mL of culture medium followed by mixing and centrifugation at 1000 RPM for 4 min. Then, the supernatant was discard, and 1-2 mL of medium was added followed by blowing evenly. After that the cell suspension was added to the culture flask and cultured overnight. The cell suspension was changed and cell density was checked in the next day.

(2) Cell Passage

When the cell density reached 80%-90%, the passage culture was performed. The culture supernatant was discarded, and the cells was rinsed with PBS solution for 1-2 times, where the solution did not contain calcium and magnesium ions. 1 ml of digestive juice (0.25% of Trypsinolide-0.53 Mary EDTA) was added into a culture bottle, digested in a 37° C. incubator for 1-2 min, and then observed under a microscope. If most of the cells became rounded and fell off, the culture bottle was taken back to the operation table quickly, tapped and then added with a small amount of culture medium to end the digestion. Each culture bottle was added with 8 mL of medium, and tapped followed by sucking the medium out. Then the culture bottle was centrifuged at 1000 rpm for 4 min, the supernatant was discarded, and 1-2 mL of culture solution was added into the culture bottle followed by blowing uniformly. The cell suspension was divided and respectively added into two new bottles containing 8 ml of culture medium according to a ratio of 1:2. Cell viability was determined by a fixable red dead cell stain kit (Life Technology Company). Cells were stained with 0.5 μL of dye in 1 mL of PBS solution in the dark for 5 min, and then washed twice with PBS solution and measured on FACS Calibur. As a positive control of dead cells, PBMCs were boiled at 95° C. for 20 min and stained with the same procedure to determine the peaks of dead cells.

The cultured PBMCs were divided into seven groups (six samples in each group), namely, group A: negative control group (PBMC); group B, PBMC+cGAMP; group C, PBMC+MncGAMP; group D, PBMC+complex VIII; group E, PBMC+complex I; group F, PBMC+complex II; and group G, PBMC+complex III. Except for group A, which was used as a control group without drug addition, all other groups were respectively added with 100 μg/mL of the corresponding drug. Each cell sample was added with 10 μL of virus, and the antiviral status of the different immune agonist complexes were determined after three weeks. The inhibition rate of virus was selected as an evaluation index. The activity titer of the virus was detected by fluorescence quantitative RT-PCR. The effects of various immune agonist complexes on viral inhibition were listed in Table 5.

TABLE 5

The inhibition rate of coronavirus by immune agonist complexes

| Groups | Average inhibition rate of coronavirus (%) |
|---|---|
| A | — |
| B | 25 ± 4 |
| C | 49 ± 7 |
| D | 62 ± 3 |
| E | 92 ± 5 |
| F | 90 ± 6 |
| G | 87 ± 5 |

Table 5 showed that the novel immune agonist complexes all had good inhibitory effects on the replication of coronavirus in PBMC cells, superior to a bare drug cGAMP or cGAMP-non-targeted liposome (complex VIII). Moreover, the immune agonist metal complex MncGAMP had a significantly improved inhibitory effect compared with a negative electronegative bare cGAMP. Therefore, the novel immune agonist complexes showed remarkably improved virus inhibition effects.

Example 5 Inhibition Effects of Novel Immune Agonist Complexes on Viral Pneumonia in Mice Experimental Animals.

Specific pathogen free (SPF)-grade $C_{57}$BL/6 male mice, aged 7-8 weeks and weighing 20-22 g, were purchased from American Animals Inc.

Feeding Conditions

All mice were fed freely with sterilized food and water, and kept at room temperature (23±2° C.), where the entire feeding process met the requirements of SPF grade.

Animal Grouping 42 mice were randomly divided into seven groups (six mice in each group), namely, group A, normal control group; group B, pneumonia model group, PBS; group C, administration with MncGAMP (dose: 10 mg/kg); group D, administration with complex VIII (dose: 10 mg/kg); group E, administration with complex IV (dose: 10 mg/kg); group F, administration with complex V (dose: 10 mg/kg); and group G, administration with complex VI (dose: 10 mg/kg).

Establishment of Pneumonia Virus Model Mice

Mice were placed under sufficiently deep anesthesia, secured in a dorsal recumbent position, and dropped with VR-841 virus suspension slowly through the inner walls of the nostrils in a volume of 60 μL (30 μL in per nostril) to ensure maximum efficiency of pulmonary infection. After that, the mice were gently removed from the bench, and the head and chest were padded with folded paper towels in small increments to ensure smooth breathing. After the mice were awakened, they were placed back into the mouse cage.

Lung Histopathological Observation

The tissue of the left lung lobes was taken, cut in half, fixed with picric acid solution for 24 hours, dehydrated, transparent, embedded by paraffin, sectioned in a thickness of 5 and then stained with hematoxylin-eosin (HE). The pathomorphological changes of the lung tissue were observed under light microscopy.

Preparation of Mouse Alveolar Lavage Solution.

An equal volume of PBS was taken and injected along the trachea of mice and then sucked out, so a few times, the alveolar lavage fluid was obtained. An equal volume of DMEM was injected intraperitoneally into the blank group and the pneumonia model group. Collected serum was stored at −80° C. The ELISA method was used to detect concentrations of TNF-alpha and IL-1beta according to the kit instructions. After the reaction was terminated, the enzyme plate was placed into the enzyme standardizer slot for detection with a 450 nm wavelength. The standard and blank control areas were identified, the corresponding optical density values were detected, and then the standard curve was plotted and the corresponding concentrations were calculated. In the mouse pneumonia model, the levels of pro-inflammatory cytokines IL-1beta and TNF-alpha were significantly increased in both serum and alveolar lavage fluid, and both were reduced to varying degrees by the administration of immune agonist complexes. The effects of the different drugs on inhibition of pneumonia in mice were shown in Table 6.

The experimental results showed that the novel immune agonist complexes IV/V/VI showed better effects on anti-inflammatory cytokines in mouse than the bare immune agonist, immune agonist metal complex, and simple immune agonist liposome. Therefore, the novel immune agonist complexes had effects on anti-inflammatory damage in mice.

TABLE 6

Inhibition effects of novel immune agonist complexes on viral pneumonia in mice

| Groups | Serum (pg/mL) | | Alveolar lavage fluid (pg/mL) | |
|---|---|---|---|---|
| | TNF-α | IL1β | TNF-α | IL1β |
| A | 500 ± 35 | 50 ± 12 | 120 ± 43 | 10 ± 5 |
| B | 1500 ± 78 | 550 ± 35 | 500 ± 56 | 70 ± 16 |
| C | 960 ± 56 | 120 ± 15 | 310 ± 78 | 45 ± 14 |
| D | 850 ± 75 | 90 ± 18 | 220 ± 32 | 30 ± 18 |
| E | 610 ± 37 | 70 ± 12 | 160 ± 43 | 22 ± 15 |
| F | 620 ± 48 | 65 ± 14 | 150 ± 26 | 25 ± 11 |
| G | 580 ± 86 | 76 ± 16 | 180 ± 46 | 18 ± 8 |

Figure 3:
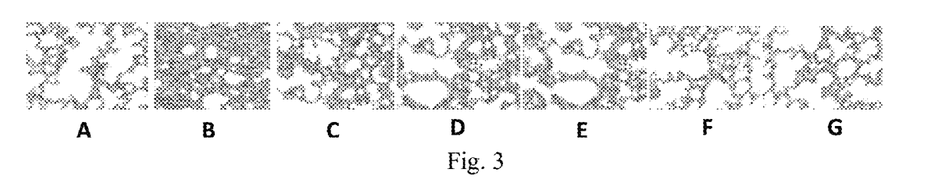
FIG. 3 schematically illustrates inhibition effects of a novel immune agonist complex prepared herein on pneumonia in mice (H&E staining of lung tissue paraffin sections).

As shown in FIG. 3, compared with the normal group, the mice in the pneumonia model group had an increased infiltration of inflammatory cells in the lungs and a significantly increased thickness of the alveolar septum. After the administration of the immune agonist MncGAMP, the symptoms of lung inflammation in mice were alleviated. Unluckily, the bare MncGAMP immune agonist was less effective, while the novel immune agonist complexes showed significantly improved efficacy.

Example 6 Evaluation of Immune Adjuvant Function of Novel Immune Agonist Complexes Experimental Animals Specific pathogen free (SPF)-grade $C_{57}BL/6$ male mice, aged 7-8 weeks and weighing 20-22 g, were purchased from American Animals Inc. The aluminum adjuvant and OVA were purchased from Invitrogen company.

Mice Grouping

The mice were divided into 7 groups (10 mice in each group), namely, group A: OVA+cGAMP; group B: OVA+MncGAMP; group C: OVA+complex VIII; group D: OVA+complex IV; group E: OVA+complex VII; group F: OVA+aluminum adjuvant; and group G: OVA.

Each mouse was injected subcutaneously with 10 μg of OVA and 100 μg of aluminum adjuvant or a different species of cGAMP (or the immune agonist complex), and those not injected were negative control groups. Immunization was performed once on days 1, 7, and 14, respectively, and lung lavage fluid was obtained and blood samples taken on day 21. The potency of the immune agonist and the complex as adjuvants to induce nanobody production was determined by ELISA, and the results were shown in Table 7. The results showed that both the immune agonist MncGAMP and immune agonist complex significantly induced immune nanobodies, superior to the aluminum adjuvant, and the novel immune agonist complexes also had higher effects in contrast to the naked cGAMP and MncGAMP.

TABLE 7

Immune adjuvant effects of novel immune agonist complexes

| Groups | Serum (IgG) | Alveolar lavage fluid (IgA) |
|---|---|---|
| A | 17.5 ± 0.9 | 2.3 ± 0.2 |
| B | 19.2 ± 1.2 | 3.5 ± 0.8 |
| C | 25.6 ± 1.5 | 4.2 ± 0.7 |
| D | 31.8 ± 1.8 | 6.5 ± 0.6 |
| E | 28.4 ± 2.1 | 5.6 ± 1.1 |
| F | 21.5 ± 1.6 | 2.8 ± 0.5 |
| G | 10.6 ± 1.2 | 1.1 ± 0.2 |

Noted:
Both IgG and IgA are values of log2.

Example 7 Effect of Novel Immune Agonist Complexes on Activation of Immune Cells Mice were raised, immunized with virus infection, and subjected to blood collection, as the same as Example 3. Isotype control nanobody was purchased from eBiosciences; antibody magnetic beads were purchased from Militeny Biotech; and flow cytometer was purchased from BD company. 14 days after immunization, mouse spleen and lung tissues were taken, ground and pounded separately, filtered with a 40-μm filter, and centrifuged at 1000 rpm for 10 min to separate unlysed immune cells. The DC cells (CD40\CD80\CD86\MHCII), T cells and (CD8+) cells were separated by the antibody magnetic beads, and added with the corresponding FAC nanobody (diluted with FACS buffer). As a negative control, the isotype control nanobody was added into the DC cells followed by incubation for 1 h, centrifugation, and rinsing with PBS. After that, the samples were analyzed by the flow cytometry to select the appropriate cells for determination of fluorescence intensity (MFI), and the results were shown in Table 8. The results showed that both the immune agonist MncGAMP and immune agonist-targeted liposome complexes significantly activated dendritic cell DCs and T cells, and the effect of the novel immune agonist complexes was significantly higher in contrast to the naked drugs cGAMP and MncGAMP.

TABLE 8

Effect of novel immune agonist complexes
on induced activation of immune cells

| Groups | CD40 cells (%) | CD80 cells (%) | CD86 cells (%) | MHCII cells (%) | CD8 cells (%) | T cells (%) |
|---|---|---|---|---|---|---|
| A (cGAMP) | 122.6 | 115.5 | 18.3 | 218.4 | 2.3 ± 0.2 | 0.3 ± 0.2 |
| B (MncGAMP) | 155.8 | 123.6 | 21.4 | 266.5 | 3.5 ± 0.8 | 0.5 ± 0.3 |
| C (complex VIII) | 186.2 | 156.6 | 19.7 | 250.8 | 4.2 ± 0.7 | 0.7 ± 0.2 |
| D (complex V) | 256.4 | 238.2 | 36.7 | 342.8 | 8.9 ± 0.6 | 1.3 ± 0.1 |
| E (complex VII) | 284.8 | 243.6 | 42.5 | 421.2 | 9.2 ± 1.1 | 1.1 ± 0.3 |
| F (blank) | 36.9 | 15.3 | 5.2 | 120.8 | 0.8 ± 0.5 | 0.2 ± 0.3 |
| G (isotype control nanobody) | 5.3 | 3.3 | 1.2 | 8 | 0.6 ± 0.2 | 0.1 ± 0.1 |

Example 8 Confirmation of Effects of Novel Immune Agonist Complexes on Cognitive Ability of AD Mice by Morris Water Maze Test APP/PS1 transgenic AD model mice were purchased from Southern Model Biotechnology Co., Ltd., which were 4 months in age, and 24-26 g in weight. The AD mice were randomly divided equally into 7 groups of 10 mice each, and the 7 groups were:
 A: AD model group, as a negative control group (administration: saline);
 B: cGAMP group, as a positive control group (dose: 10 mg/kg);
 C: ZncGAMP group, (dose: 10 mg/kg);
 D: ZncGAMP-Lipo group, (dose: 10 mg/kg);
 E: complex IX (dose: 10 mg/kg);
 F: complex VII (dose: 10 mg/kg); and
 G: complex X (dose: 10 mg/kg).
 Drugs under test:
 STING agonist (cGAMP);
 STING agonist metal complex (ZncGAMP);
 STING agonist liposome complex (ZncGAMP-Lipo);
 ZncGAMP-anti-TfR1-liposome (complex IX);
 ZncGAMP-gH625-liposome (complex VII); and
 ZncGAMP-gH625-PT8-liposome (complex X).
 Properties: white powder.
 Solvent: physiological saline.
 Preparation method: prepare a solution with physiological saline solution to the required concentration before use.
 Administration dose: 10 mg/kg.
 Administration route: intraperitoneal injection.
 Frequency: once a day for consecutive 60 days.
 Morris water maze experimental device and a method thereof were described below.

A circular pool was designed, which was 1 m in diameter, 50 cm in height, 30 cm deep, and white bottom. The temperature of water in the circular pool was maintained at 23±2° C. Four equidistant points N, E, S, W marked on the wall of the circular pool as the starting point of the experiment, and divided the circular pool into four quadrants. A platform was placed in the center of the third quadrant (the platform was at an equal distance from the center of the circle of the wall of the circular pool), and submerged under the water for 1 cm to make the platform non-visible. The circular pool was surrounded by abundant reference cues (triangles, quadrangles, circles, and diamonds of different colors placed in each quadrant) and kept constant for the mice to locate the platform. Positioning navigation test was performed. The test lasted for 6 days, and the training was scheduled four times a day at a fixed period. At the beginning of the training, the platform was placed in the first quadrant and the mice were placed into the circular pool facing the wall from any one of the four starting points on the wall. A free video recording system was used to record the time for finding the platform and the swimming path of the mice. The mice were placed into the water from four different starting points (different quadrants) after the four trials. After the mice found the platform or could not find the platform within 90 seconds (the latency period was recorded as 90 seconds), they were guided to the platform by the experimenter and rested on the platform for 10 seconds before the next trial.

Space exploration tests were described below.

24 h after the end of the positioning navigation test, the platform was removed. Then the mice were put into the water from the third quadrant, and the swimming paths of the mice were recorded within 180 s. The residence time of the mice in the target quadrant (third quadrant) and the number of times they crossed the location of the original platform were recorded to observe the spatial orientation ability of the mice. SPSS10.0 software was used for processing, and one-way ANOVA test was used to compare the significance of the differences among the groups. The experimental results were shown in Table 9 (group A: AD model control group, group B: cGAMP administration group, group C: ZncGAMP administration group, group D: ZncGAMP-Lipo administration group, group E: complex IX administration group, group F: complex VII administration group, and group G: complex X administration group). The results showed that STING agonist cGAMP, the metal complex (i.e. ZncGAMP) and the immune agonist complexes significantly improved cognitive performance of mice suffering from Alzheimer's disease after administration for 60 days. The metal complex ZncGAMP showed a superior performance to cGAMP. The three novel immune agonist complexes were more effective than the non-targeted ZncGAMP-Lipo and more significantly superior to the STING agonist cGAMP and the metal complex thereof ZncGAMP.

TABLE 9

Cognitive improvement effects of novel immune agonist
complexes on mice suffering from Alzheimer's disease

| Groups | Percentage of time to cross the third quadrant platform in AD mice (%) |
|---|---|
| A | 0.41 ± 0.11 |
| B | 0.55 ± 0.10 |
| C | 0.62 ± 0.09 |
| D | 0.75 ± 0.10 |
| E | 0.85 ± 0.08 |
| F | 0.82 ± 0.11 |
| G | 0.88 ± 0.10 |

Example 9 Effect of Immune Agonist Complexes on Brain Amyloid Plaques in AD Mice Seven groups of AD mice in the above examples were tested in view of reduction of amyloid plaques in the brains of AD mice after 60 days of administration. The experiment was a thioflavin S staining experiment, and the experimental procedures were described below. 60 days after drug administration, brain tissue of mice was taken, fixed, embedded with paraffin, sectioned, de-waxed with xylene, dehydrated with ethanol gradient, and rinsed with TBS solution three times. After that, 0.3% thioflavin S (dissolved in 50% ethanol) was dropped on the tissue followed by incubation for 10 min at room temperature, rinsing with 50% ethanol three times, rinsing with TBS solution, drying in the shade, and sealing. Then the issue was examined by laser confocal microscopy (Leica, Germany) to detect the changes in the amount of amyloid plaque deposition in the brain of AD mice. The results were shown in Table 10. The results showed that STING agonist cGAMP, the metal complex ZncGAMP, and the immune agonist complexes significantly mitigated the level of amyloid plaques in the brain tissue of AD mice after 60 days of administration. The metal complex ZncGAMP was significantly more than cGAMP. The three immune agonist-brain-targeted complexes were more effective than the non-targeted ZncGAMP-Lipo and more significantly superior to the STING agonist cGAMP and the metal complex ZncGAMP.

TABLE 10

Effect of novel immune agonist complexes on inhibition of brain amyloid plaques in AD mice

| Groups | Average count points of fluorescence intensity of amyloid plaques in brain tissues of AD mice (field of view area) |
|---|---|
| A (AD model control group) | 2900 ± 180 |
| B (cGAMP administration group) | 1800 ± 160 |
| C (ZncGAMP administration group) | 1400 ± 170 |
| D (ZncGAMP-Lipo administration group) | 800 ± 110 |
| E (complex IX administration group) | 450 ± 65 |
| F (complex VII administration group) | 500 ± 82 |
| G (complex X administration group) | 380 ± 68 |

Example 10 Expression Regulation of TREM2 and Inflammatory Factor of Brain Tissues of AD Mouse by Novel Immune Agonist Complexes ELISA kits were purchased from Cloud Clone. Flow cytometry nanobodies were purchased from eBiosciences. RT-PCR reagents were purchased from Takara. Immune fluorescence and immune histochemistry nanobodies were purchased from Abcam. Other reagents were purchased from Sigma-Aldrich. Primer synthesis was done by Shanghai Biotechnology Co. Laser confocal microscope was purchased from Leica (Germany). 7500 quantitative PCR instrument was purchased from Applied Biosystems ABI (USA). Light microscope was purchased from Leica (Germany). Enzyme marker was purchased from Hangzhou Aosheng Company. Attune flow cytometer was purchased from Thermo Fisher Scientific. RT-PCR in vitro TREM2 content was determined, and the TREM2 primer sequences were as follows:

```
Forward:
                                  (SEQ ID NO: 3)
5'-AGAAGCGGAATGGGAGC-3';
and Reverse:
                                  (SEQ ID NO: 4)
5'-GAGGTGGGTGGGAAGGA-3'.
```

Whether mRNA levels of TREM2 in brain tissues of mice were altered after administration of the immune agonist and complexes thereof was determined. As shown in Table 11, the B-G drug groups had significant effects on TREM2 expression levels in brain tissues of AD mouse respectively. The results showed that there was a significant increase in TREM2 expression after 60 days of administration immune agonists and complexes thereof, and the three novel immune agonist complexes were more effective than the non-targeted ZncGAMP-Lipo and more significantly superior to the STING agonist cGAMP and the metal complex ZncGAMP.

To explore the effect of the above immune agonists and complexes thereof on neuroinflammation in the brain of AD mice, the content of pro-inflammatory factors in brain tissues of AD mice was determined by ELISA method. The content of pro-inflammatory factors IL-1β and TNF-α in brain tissues of AD mice were measured respectively.

Brain tissue samples were processed through the following steps.

Fresh brain tissues of mice were taken and weighed, and the content of inflammatory factors IL-1β and TNF-α in brain tissues was determined by using the Cloud Clone ELISA kit. As shown in Table 11, the levels of pro-inflammatory factors IL-1β and TNF-α in brain tissues of mice were significantly decreased after two months of administration, compared to the levels of pro-inflammatory factors IL-1β and TNF-α in the AD model group. These results suggested that immune agonists and complexes thereof were capable of significantly reducing pro-inflammatory factors in the central nervous system. The three immune agonist-brain-targeted nanocarrier complexes (namely, complexes IX, VII, and X) were more effective than the non-targeted ZncGAMP-Lipo and more significantly superior to the STING agonist cGAMP and the metal complex thereof ZncGAMP. Therefore, the immune agonist-brain-targeted nanocarrier complexes were able to eliminate the chronic neuroinflammation present in the course of AD in mice.

Increasing evidence suggested that high levels of expression of multiple pro-inflammatory factors were closely associated with cognitive deficits in APP/PS1 di-transgenic AD mice, suggesting that a range of inflammatory signaling pathways were involved in the course of AD disease ultimately leading to cognitive deficits. Therefore, the immune agonist-brain-targeted nanocarrier complexes leaded to the reduced expression of pro-inflammatory factor, improving learning memory of mice and reducing Aβ deposition in the brain of AD mice, which was consistent with the results of the above embodiment studies.

TABLE 11

Modulation of TREM2 and inflammatory factors IL-1β and TNF-α in brain tissues of AD mice by immune agonist complexes

| Groups | TREM2 (pg/mg) | IL-1β (pg/mg) | TNF-α (pg/mg) |
|---|---|---|---|
| A (AD model control group) | 48.42 ± 0.35 | 58.29 ± 0.33 | 44.18 ± 0.09 |
| B (cGAMP administration group) | 55.38 ± 0.27 | 46.18 ± 0.09 | 35.52 ± 0.35 |
| C (ZncGAMP administration group) | 62.29 ± 0.19 | 39.31 ± 0.17 | 29.41 ± 0.53 |
| D (ZncGAMP-Lipo administration group) | 71.16 ± 0.31 | 25.45 ± 0.41 | 18.32 ± 0.31 |
| E (complex IX administration group) | 80.34 ± 0.34 | 15.27 ± 0.23 | 11.19 ± 0.45 |
| F (complex VII administration group) | 78.45 ± 0.27 | 18.38 ± 0.31 | 13.32 ± 0.12 |
| G (complex X administration group) | 86.32 ± 0.19 | 12.24 ± 0.53 | 9.21 ± 0.23 |

Example 11 Evaluation of Therapeutic Effect of Novel Immune Agonist Complex on Ischemic Cerebrovascular Disease Healthy male ICR mice, weighing 18-20 g, were purchased from Shanghai Slaughter Laboratory Animal Co (quality certificate number (SCXK(SH) 2007-0005)) and raised in a cleaning experimental animal room.

Mouse Model.

Local cerebral ischemia model was made by wire bolus method to verify the therapeutic effects of immune agonist complexes on cerebral ischemic brain diseases in experimental animals.

Experimental Methods

Experimental mice were anesthetized with 10% chloral hydrate intraperitoneally, and a median cervical incision was made to separate and ligate the proximal segment of the right common carotid artery, the carotid artery and branch vessels thereof. The right internal carotid artery was isolated, the pterygopalatine artery was isolated downward along the internal carotid artery, and the root was ligated for this branch. The proximal end of the internal carotid was provided with a prepared wire, and the distal end of the internal carotid was provided with an artery clip. The common carotid artery was incised at the bifurcation and tethered with the nylon line. The nylon line was tethered into the internal carotid artery, the skull and the anterior cerebral artery to block all sources of blood flowing in the cerebral arteries in the brain. The artery clip was withdrawn, and tethered with the prepared wire to suture the skin. Then the mice were returned to cage for feeding and raising. Drugs were administered by intraperitoneal injection after ischemia for 2 h, and the nylon wire was removed for reperfusion for 8 h and then drug administration. Behavioral scoring was performed after surgery, and the scoring was single-blinded with reference to the *Zea Longa* 5-point scale, which was scored as follows: 0, normal mice with no signs of neurological injury; 1, unable to fully extend the contralateral front paw; 2, turning in a circle to the outside; 3, relatively measured tipping; and 4, unable to walk spontaneously, and loss of consciousness injury.

Drug Administration and Effects Thereof on Behavioral Scores in a Cerebral Ischemia Model of Mice Dose Design The mice were randomly and equally divided into 7 groups, and 10 mice in each group, and the 7 groups were:
 A: AD model group, as a negative control group (saline group);
 B: cGAMP group, as a positive control group (dose: 10 mg/kg);
 C: ZncGAMP group (dose: 10 mg/kg);
 D: ZncGAMP-Lipo group (dose: 10 mg/kg);
 E: complex IX group (dose: 10 mg/kg);
 F: complex VII group (dose: 0 mg/kg);
 G: complex X group (dose: 10 mg/kg).

Properties: white powder.

Solvent: physiological saline.

Preparation method: prepare the solution with physiological saline solution to the required concentration before use.

Administration dose: 10 mg/kg.

Administration method: intraperitoneal injection; 1 dose after 2 hours of ischemia, and 1 dose after 8 hours of reperfusion by pulling out the nylon line; and 1 dose after 24 hours, and 7 days of administration.

Experimental Results

The results after administration showed that intraperitoneal administration improved behavioral scores in mice with localized cerebral ischemia, and the new immune agonist complexes (IX, VII, and X) all had significantly improved efficacy over the immune agonists alone. The scoring results were shown in Table 12.

TABLE 12

Effect of drug administration on behavioral scores in mice with localized cerebral ischemia

| Groups | Behavioral scores (24 hours after surgery) | Behavioral scores (7 days after surgery) |
|---|---|---|
| A (cerebral ischemia model control group) | 2.90 ± 0.32 | 2.82 ± 0.28 |
| B (cGAMP group) | 2.26 ± 0.40 | 1.65 ± 0.34 |
| C (ZncGAMP group) | 2.08 ± 0.51 | 1.58 ± 0.36 |
| D (ZncGAMP-Lipo group) | 1.84 ± 0.21 | 1.46 ± 0.32 |
| E (complex IX group) | 1.75 ± 0.49 | 1.29 ± 0.17 |
| F (complex VII group) | 1.78 ± 0.42 | 1.36 ± 0.21 |
| G (complex X group) | 1.62 ± 0.34 | 1.25 ± 0.18 |

Example 12 Evaluation of Acute Toxicity of Novel Immune Agonist Complexes

Experimental Materials

60 ICR mice (purchased from Shanghai Slaughter Laboratory Animal Co., Ltd. [Laboratory Animal Quality Certificate No. SCXK (Shanghai) 2007-0005]), were bisexual each half, 20-22 g in weight, fed with pellet diet, and fed and watered freely.

Experimental Methods

ICR mice were injected intraperitoneally with 1 g/kg of the novel immune agonist complexes (I, II, III, IV, V, VI, VII, VIII, IX, X) (prepared with PBS), and the toxic reactions and mortality of the mice were observed within 14 days after the administration. The results showed that the mice moved normally after intraperitoneal injection of the drug, and none of the mice died within 14 days after the administration. On the 15$^{th}$ day, all mice were executed, dissected to be examined visually, and no obvious lesions were found.

Experimental Results

The above experimental results showed that the maximum tolerated dose (MTD) was not less than 1 g/Kg when administered intraperitoneally, indicating that the acute toxicities of the novel immune agonist complexes were low.

---

---

What is claimed is:

1. A method for treating a tumor in a subject in need thereof, comprising:
   administering a therapeutically effective amount of an immune agonist complex to the subject;
   wherein the immune agonist complex is selected from the group consisting of MncGAMP-anti-human PD-1 nanobody-liposome (complex I), MncGAMP-anti-human PD-L1 nanobody-liposome (complex II), MncGAMP-anti-human CD47 nanobody-liposome (complex III), MncGAMP-anti-mouse PD-1 nanobody-liposome (complex IV), MncGAMP-anti-mouse PD-L1 nanobody-liposome (complex V), MncGAMP-anti-mouse CD47 nanobody-liposome (complex VI), ZncGAMP-gH625-liposome (complex VII) and ZncGAMP-anti-mouse TfR1 nanobody-liposome (complex IX);
   a liposome component in the immune agonist complex comprises lecithin, cholesterol, and 1,2-distearoyl-SN-glycerol-3-phosphorylethonolamine-N-maleimide-polyethylene glycol;
   in the immune agonist complex, the liposome component is linked to a nanobody component via a thioether bond;
   the tumor is selected from the group consisting of colorectal cancer, breast cancer and lung cancer; and
   an administration route is selected from the group consisting of intravenous injection, intramuscular injection, subcutaneous injection, intravenous drip, intranasal drip, oral administration, and a combination thereof.

2. A method for treating tumor metastasis in a subject in need thereof, comprising:
   administering a therapeutically effective amount of an immune agonist complex to the subject;
   wherein the immune agonist complex is selected from the group consisting of MncGAMP-anti-human PD-1 nanobody-liposome (complex I), MncGAMP-anti-human PD-L1 nanobody-liposome (complex II), MncGAMP-anti-human CD47 nanobody-liposome (complex III), MncGAMP-anti-mouse PD-1 nanobody-liposome (complex IV), MncGAMP-anti-mouse PD-L1 nanobody-liposome (complex V), MncGAMP-anti-mouse CD47 nanobody-liposome (complex VI), ZncGAMP-gH625-liposome (complex VII) and ZncGAMP-anti-mouse TfR1 nanobody-liposome (complex IX);
   a liposome component in the immune agonist complex comprises lecithin, cholesterol, and 1,2-distearoyl-SN-glycerol-3-phosphorylethonolamine-N-maleimide-polyethylene glycol;

in the immune agonist complex, the liposome component is linked to a nanobody component via a thioether bond;

the tumor metastasis is lung metastasis, liver metastasis, lymphatic metastasis, or brain metastasis of breast cancer; and an administration route is selected from the group consisting of intravenous injection, intramuscular injection, subcutaneous injection, intravenous drip, intranasal drip, oral administration, and a combination thereof.

* * * * *